W. EBERHARD & R. TURNER,

Assignors to S. HOWER.

OATMEAL MACHINE.

No. 10,084. Reissued Apr. 11, 1882.

WITNESSES

V. F. Howland

Philip R. Welsh

INVENTORS

W. Eberhard

R. Turner

By Bradford Howland

ATTORNEY

N. PETERS, Photo-Lithographer, Washington, D. C.

UNITED STATES PATENT OFFICE.

WILLIAM EBERHARD AND ROBERT TURNER, OF AKRON, OHIO, ASSIGNORS TO SUSAN HOWER, OF SAME PLACE.

OATMEAL-MACHINE.

SPECIFICATION forming part of Reissued Letters Patent No. 10,084, dated April 11, 1882.

Original No. 208,970, dated October 15, 1878. Application for reissue filed October 17, 1881.

*To all whom it may concern:*

Be it known that we, WILLIAM EBERHARD and ROBERT TURNER, of Akron, in the county of Summit and State of Ohio, have invented a new and useful Improvement in Machines for Granulating Grain, of which the following is a specification.

Figure 1:
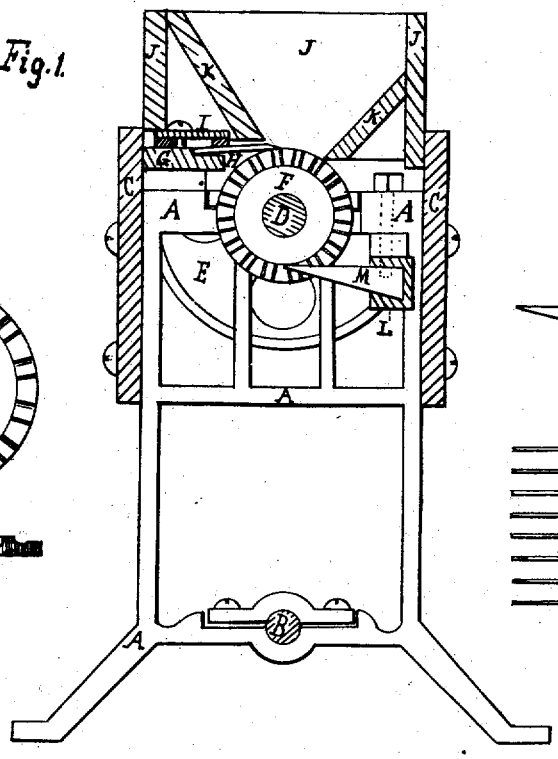
Figure 3:
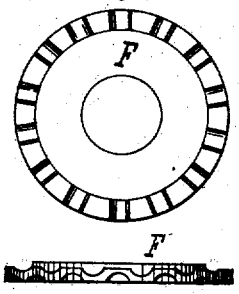
Figure 4:
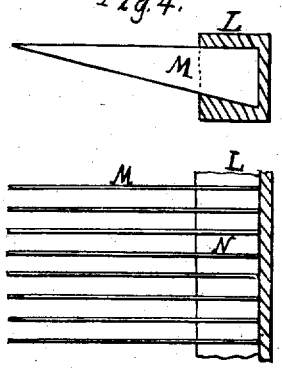
Figure 2:
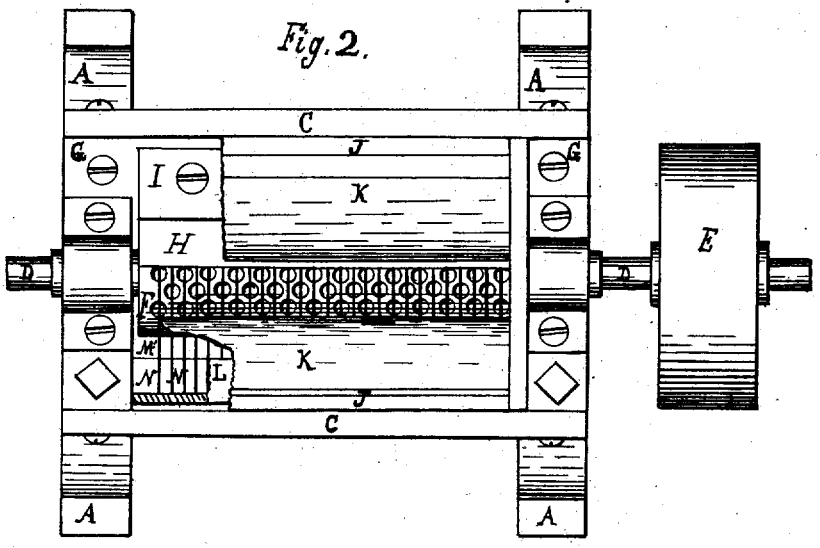

Figure 1 is a vertical cross-section of our improved machine. Fig. 2 is a top view of the same, part of the hopper being broken away to show the construction. Fig. 3 is a detail side and edge view of one of the roller-sections. Fig. 4 is a detail section and top view of a portion of the clearing device.

The object of this invention is to furnish an improved machine for granulating or cutting grain—such as oats, wheat, barley, corn, &c.—which shall be simple in construction, convenient in use, and effective in operation, doing its work rapidly and well and keeping itself clear.

The invention consists, first, of a roller provided with cells, in which the oats are held endwise and projecting above the feeding side of the roller, in combination with a knife on the feeding side of the roller to cut off the projecting portions of the kernels; second, in the combination of the roller having circular rows of holes in its face and ring-grooves through the said holes, the clearers, knife, and hopper; third, in the combination of the grooved bar, the clearers, separating-blocks, and the roller formed with its holes and ring-grooves; fourth, in the combination of the roller formed with its holes and ring-grooves, the knife, and its supporting and clamping bars with each other and with the frame and hopper.

Similar letters of reference indicate corresponding parts.

A are the end frames of the machine, which are connected at their lower ends by a rod, B, and at their upper parts by the side boards, C.

In bearings in the upper parts of the frames A revolves a shaft, D, to one of the ends of which is attached a pulley, E, to receive the driving-belt.

To the shaft D, between the frames A, are attached ring-plates or sections F, in the opposite sides of the edges of which are formed alternately half-round or polygonal notches, which, when the sections F are arranged side by side upon the shaft D, form round or polygonal holes to receive the ends of the kernels. The notched parts of the sections F are made a little thinner than the bodies of the said sections to form ring-grooves through the centers of the holes formed by the said notches.

G is a bar the ends of which are bolted to the top cross-bars of the frame A at one side of the roller D F. The upper forward part of the bar G is rabbeted to form a seat for the rear part of the knife H, the forward part or edge of which rests upon the upper side of the roller D F. The knife H is secured in place adjustably by the plate I, which is bolted to the bar G, and the forward part of which overlaps the rear part of the said knife H. Leather or other packing may be interposed between the plate I and the bar G and knife H, if desired. The height of the bar G may also be adjusted by washers and packing interposed between its ends and the bars of the frames A, to which the said bars are secured.

J is the hopper, which fits upon and is secured to the top of the machine, and which is provided with inclined side boards, K, so that the grain to be operated upon will only come in contact with the upper part of the roller D F.

To the under sides of the top cross-bars of the frames A is bolted a bar, L, upon the opposite side of the roller D F from the bar G, and which is adjusted in height by washers or packing interposed between it and the said cross-bar of the frames A. In the inner side of the bar L is formed a half-dovetailed groove to receive the rear ends of the triangular-shaped clearers M, which are made of such a thickness that their forward ends may enter the ring-grooves through the holes in the roller D F and push out any parts of kernels that may stick in the holes of the said roller. The clearers M are kept at the proper distance apart by blocks N, fitted into the groove in the bar L and interposed between the said clearers M.

With this construction, as the roller D F is revolved the ends of the kernels of grain enter the holes in the face of the said roller, and the said kernels are carried against and cut off by the edge of the knife H, no kernels of grain escaping, except in pieces so small as to enter and be carried out by the holes of the said roller D F.

If desired, more than one roller D F can be put in the same frame and run from the same power by suitable gearing.

The rollers may be made of iron or steel, as may be desired.

Having thus described our invention, we claim as new and desire to secure by Letters Patent—

1. In a grain-cutting machine, a roller formed with cells which are open at the feeding side of the roller and hold the kernels supported on the bottom of the cells in an endwise position and projecting above the feeding side of the roller, in combination with a knife at the feeding side which cuts off the projecting portions of said kernels, substantially as set forth.

2. The combination of the roller D F, having circular rows of holes in its face and ring-grooves through the said holes, the clearers M, knife H, and hopper J K, substantially as described.

3. The combination of the grooved bar L, the clearers M, and the separating-blocks N with the roller D F, formed with its holes and ring-grooves, substantially as described.

4. The combination of the roller D F, formed with its holes and ring-grooves, and the knife H, and its supporting and clamping bars G I, with each other and with the frame A B C and the hopper J K, substantially as described.

WILLIAM EBERHARD.
ROBERT TURNER.

Witnesses:
J. D. HORTON,
BRADFORD HOWLAND.